United States Patent [19]
Kuhfus

[11] 3,946,977
[45] Mar. 30, 1976

[54] TELEPHONE UNIT WITH RETRACTABLE MOUNTING BRACKET

[75] Inventor: Gerd Kuhfus, London, Canada

[73] Assignee: Northern Electric Company, Limited, Montreal, Canada

[22] Filed: Nov. 20, 1974

[21] Appl. No.: 525,645

[52] U.S. Cl. ............ 248/126; 179/146 R; 179/178; 248/298
[51] Int. Cl.² ...................................... A47G 29/00
[58] Field of Search ........... 179/100, 146, 147, 148, 179/151, 178; 248/466, 469–471, 475, 476, 489, 495, 497, 498, 117.1, 117.2, 114, 115, 126, 121–125, 359, 360, 274, 288, 295, 298, 300, 301, 304, 307, 309, 310, 311, 316 D, 317, 323, 327, 339, 346, 240, 224, 241, 243, 244, 247, 248, 424, 429; 211/134, 135, 148, 150, 153, 195, 13, 42, 43, 71, 86, 87, 103

[56] References Cited
UNITED STATES PATENTS

| | | | |
|---|---|---|---|
| 1,360,180 | 11/1920 | Congor | 211/135 X |
| 1,647,794 | 11/1927 | Gibson | 248/298 X |
| 2,473,731 | 6/1949 | Shepard, Sr. | 248/117.2 |
| 2,588,862 | 3/1952 | Mayo | 248/310 X |
| 2,868,888 | 1/1959 | Bender | 179/198 X |
| 2,979,296 | 4/1961 | Groocock | 248/285 X |
| 3,851,119 | 11/1974 | Tucker | 179/146 R |

Primary Examiner—Roy D. Frazier
Assistant Examiner—Terrell P. Lewis
Attorney, Agent, or Firm—Sidney T. Jelly

[57] ABSTRACT

A telephone unit adaptable for either wall or desk top mounting has a retractable bracket, slidably mounted in a recess in the bottom surface of the telephone unit base. The bracket has a head portion having a keyhole aperture for fitting over a screw or similar item on the wall, and a stem portion slidable longitudinally in the recess. Two bosses formed on the telephone unit base extend through slots in the stem portion and screws in the bosses hold the bracket in position. When extended the head portion extends slightly from the base while in the retracted position the bracket is concealed.

1 Claim, 5 Drawing Figures

U.S. Patent   March 30, 1976   3,946,977
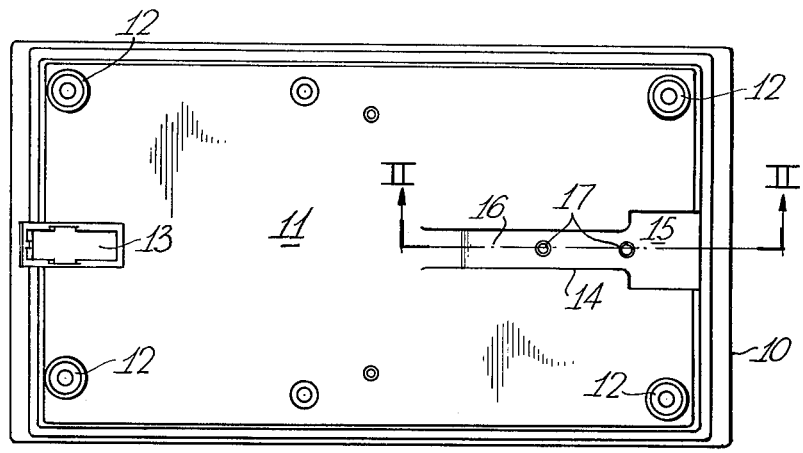
Fig-1-
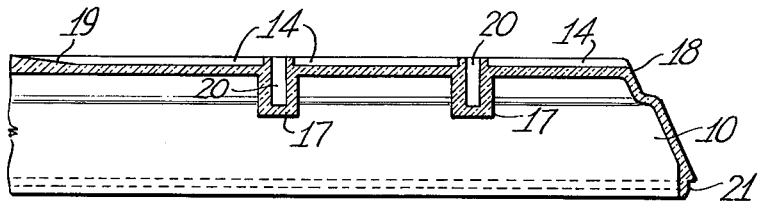
Fig-2-
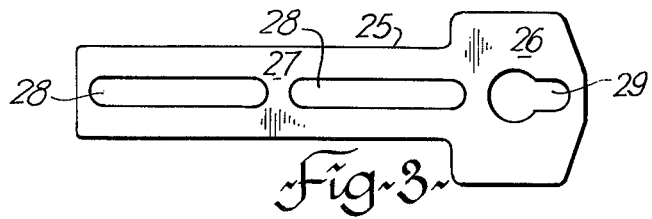
Fig-3-
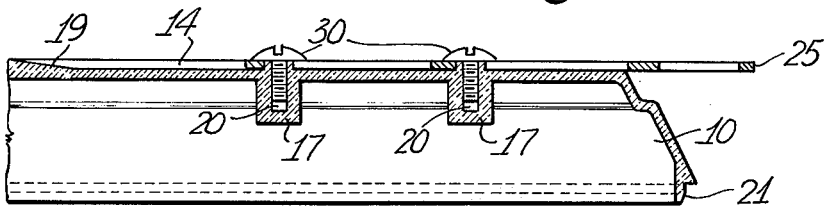
Fig-4-
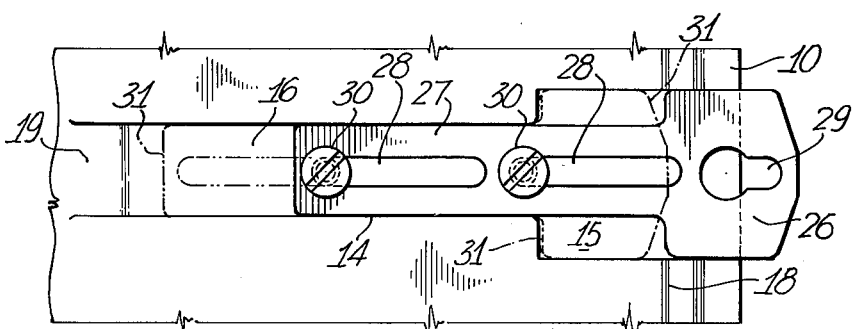
Fig-5-

TELEPHONE UNIT WITH RETRACTABLE MOUNTING BRACKET

This invention relates to telephone units with retractable mounting brackets and is particularly concerned with telephone units which can be positioned at will either on a horizontal surface, such as a desk or table, or on a vertical or inclined surface, such as a wall or an inclined desk top or similar surface.

To reduce stock inventory it is desirable to make telephone units universal in that alternative mounting positions will not require differing forms of unit. Also, it is desirable that a user be able to alter the mounting position without having to have the unit changed.

However, to enable a unit normally positioned on a horizontal surface to be mounted on a vertical, or inclined, surface has meant providing some form of adaptor. Often this still required the services of an installation engineer, and usually detracts from the appearance of the unit.

The present invention provides a telephone unit which has a retractable mounting bracket such that the unit is readily removed from a flat surface to a vertical, or inclined, surface by pulling out the bracket and using the bracket to mount the unit on the wall. When desired to be repositioned on a horizontal surface, the unit is easily demounted from the wall, the bracket retracted, and the unit then rests on the horizontal surface. The bracket is not seen when the unit is on the horizontal surface and only a very short length of bracket can be seen when wall mounted.

The invention will be readily understood by the following description of one embodiment, by way of example, in conjunction with the accompanying drawings, in which:

FIG. 1 is a plan view of a base of a telephone unit;

FIG. 2 is a cross-section on the line II—II of FIG. 1;

FIG. 3 is a plan view of a bracket for use with the base of FIG. 1;

FIG. 4 is a cross-section similar to that of FIG. 2, with the bracket of FIG. 3 in position, and extended as for mounting;

FIG. 5 is a partial plan view of the base with the bracket in position, extended.

FIG. 1 illustrates a base 10 of a telephone unit. The base has a substantially flat base surface 11 and has feet 12, conveniently rubber or plastic, attached at each corner. At one end is an aperture 13 for entry of the telephone cord via a grommet, not shown.

At the other end the base surface has a recess 14, in the present example of T shape, the top or cross-bar 15 of the T being at the periphery of the base 10 and the stem portion 16 directed along the longitudinal axis of the base. Two bosses 17 are provided in the recess 14, the top surfaces of the bosses level with the base surface 11.

The recess 14, and bosses 17, are seen more clearly in FIG. 2. Recess 14 extends from the peripheral edge 18, and has an inclined inner end 19. The bosses 17 extend into the base 10 and have bores 20 for the reception of threaded screws as will be described. The base 10 is of hollow form, and forms the base housing of the telephone unit, a top housing, not shown, fitting over the edge 21 which forms a locating formation.

FIG. 3 illustrates a bracket 25, in the present example of T shape to conform with the shape of the recess 14 in the base 10. The bracket 25 has a head portion 26 and a stem portion 27. In the stem portion are formed two slots 28 extending along the axis of the stem portion, and in the head portion there is formed an aperture 29, in the present example a keyhole shaped slot.

FIGS. 4 and 5 illustrate the bracket 25 in position in the recess 14, the bracket extended. The bracket is held in position in the recess by the slots 28 being positioned over the bosses 17. Screws 30, conveniently selftapping screws, are inserted into the bores 20 of the bosses 17, and the heads of the screws retain the bracket in the recess. The bracket can slide in the recess. In FIGS. 4 and 5 the bracket is shown extended to uncover the keyhole slot 29. This slot can be positioned over a screw in the wall or other surface, the head of the screw being passed through the larger portion of the keyhole slot and then the shank of the screw passing into the narrower portion of the keyhole slot by moving the telephone unit downwards.

When the telephone unit is to be positioned with the base surface 11 on a table or similar substantially horizontal surface, the bracket is retracted, as by pushing on the end. The retracted position is indicated in FIG. 5 by the dotted outline 31.

The inclined end 19 of the recess 14 assists in moving the bracket from the retracted position to the inclined position, by enabling a finger tip to be pushed against the end of the stem portion 27 of the bracket. The bracket is held in the retracted position by friction.

What is claimed is:

1. A telephone unit comprising:
   a base housing for resting on a horizontal surface, said base housing including a base surface and a peripherally extending wall, said base surface having a forward end and a rearward end and a central axis extending from said forward end to said rearward end;
   a recess in said base surface, said recess of Tee formation having a stem portion and a cross-bar portion, the cross-bar portion of the Tee formation extending to said peripheral wall at said rearward end of said base surface and said stem portion extending from said cross-bar portion along said central axis of said base surface;
   two spaced bosses in said recess on said central axis, said bosses integral with said base housing, a surface of each boss substantially level with said base surface;
   a Tee shaped bracket in said recess, said bracket including a head portion and a stem portion, said head portion adapted to fit in said cross-bar portion of said recess, said stem portion of said bracket a sliding fit in said stem portion of said recess, said bracket slidable along said central axis from a retracted position wherein said head portion is entirely in said cross-bar portion of said recess to an extended position wherein a major part of said head portion extends from said cross-bar portion of said recess beyond said peripheral wall;
   an aperture in said head portion of said bracket, said aperture of a keyhole form including a small diameter portion adjacent an outer edge of said head portion and a large diameter portion toward said stem portion, said aperture exposed when said bracket is in an extended position;
   two elongated slots formed in said stem portion of said bracket, said slots extending along the longitudinal axis of the stem portion and positioned over said bosses;

retaining means in said bosses extending through said slots and including head portions engaging said stem portion of said bracket to retain said bracket in said recess, and an aperture in said base housing at the bottom periphery edge of said base surface for the entry of a telephone cord;

the arrangement such that on extending said bracket to said extended position to expose said aperture of keyhole form in said head portion of said bracket, the telephone unit can be mounted on a vertical surface by engagement of said aperture of keyhole form with mounting means on said vertical surface.

* * * * *